United States Patent Office 2,899,000
Patented Aug. 11, 1959

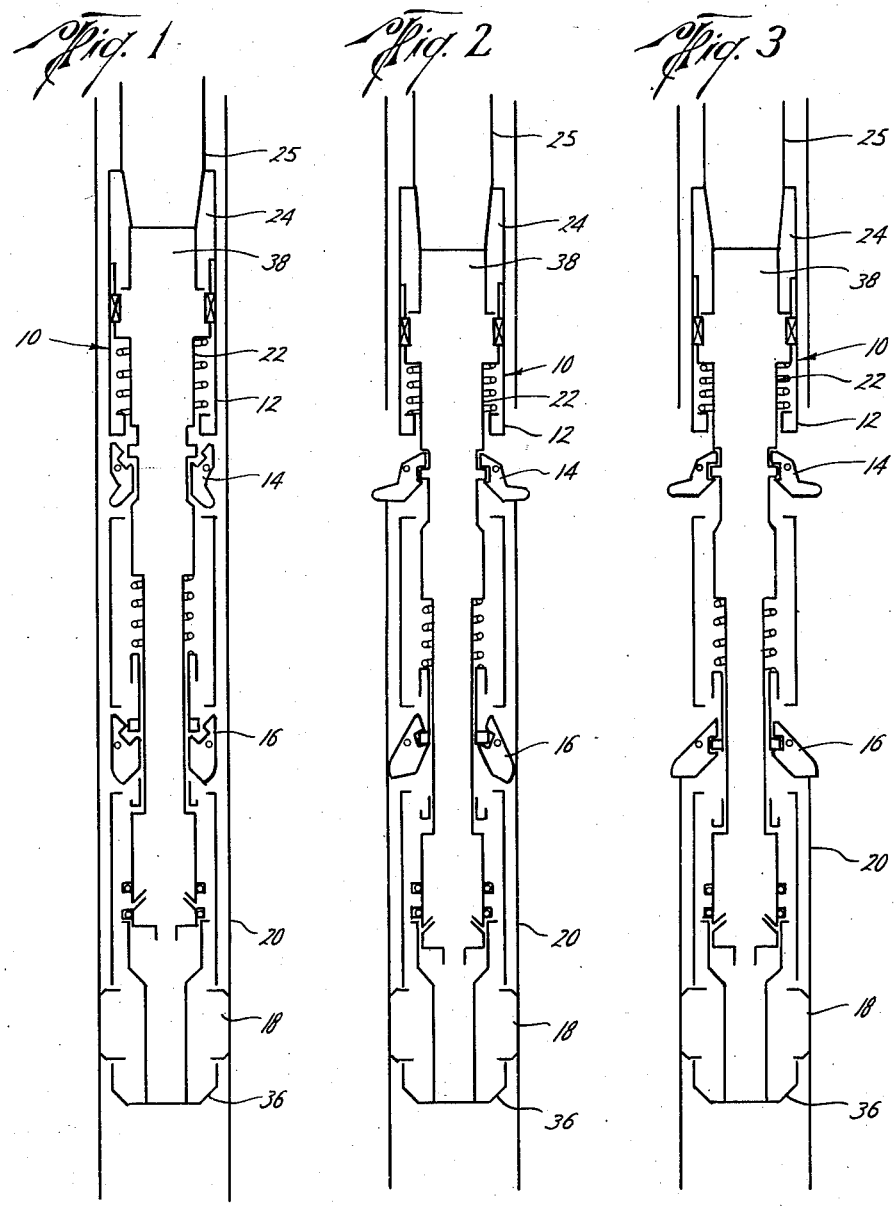

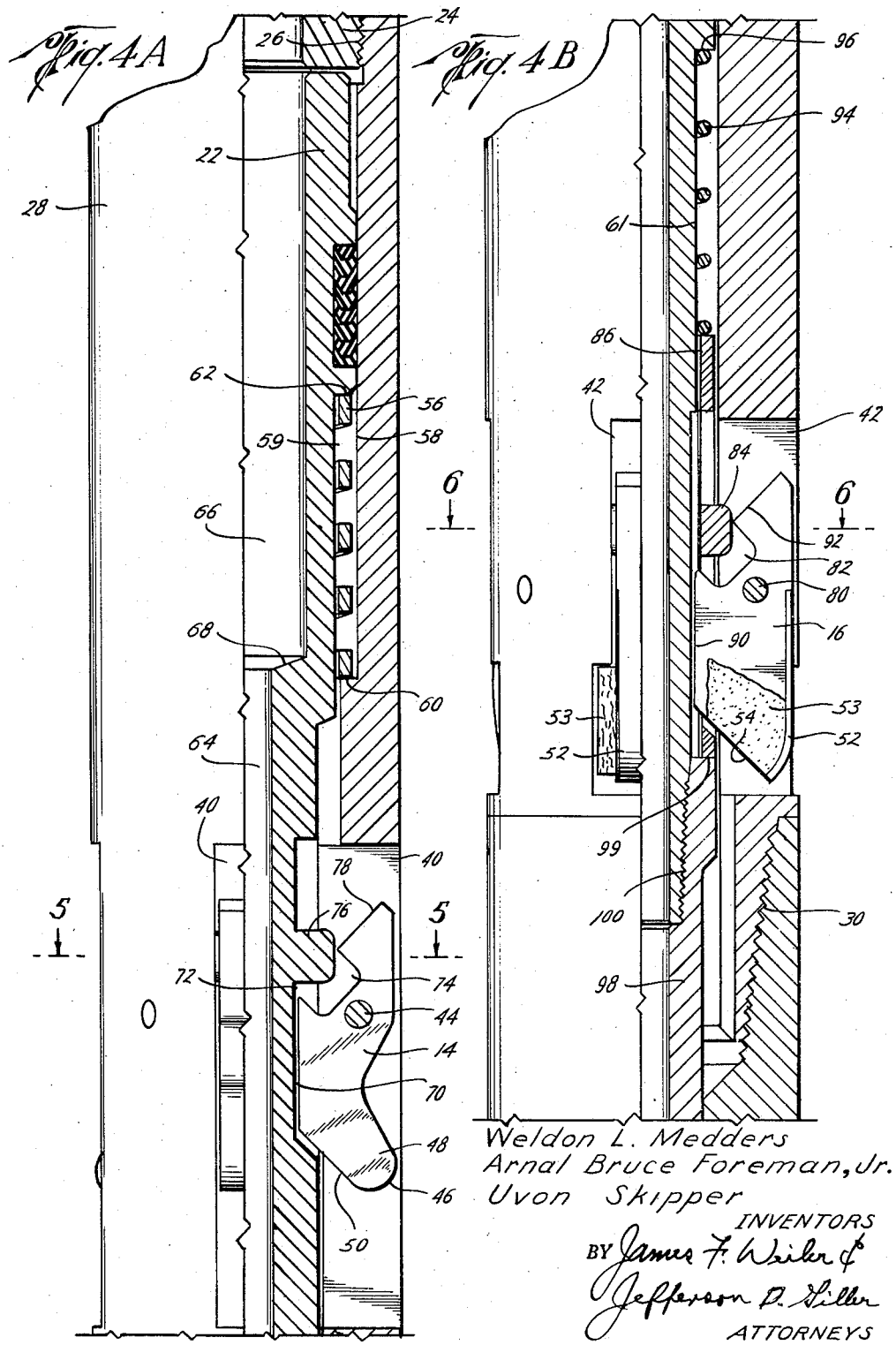

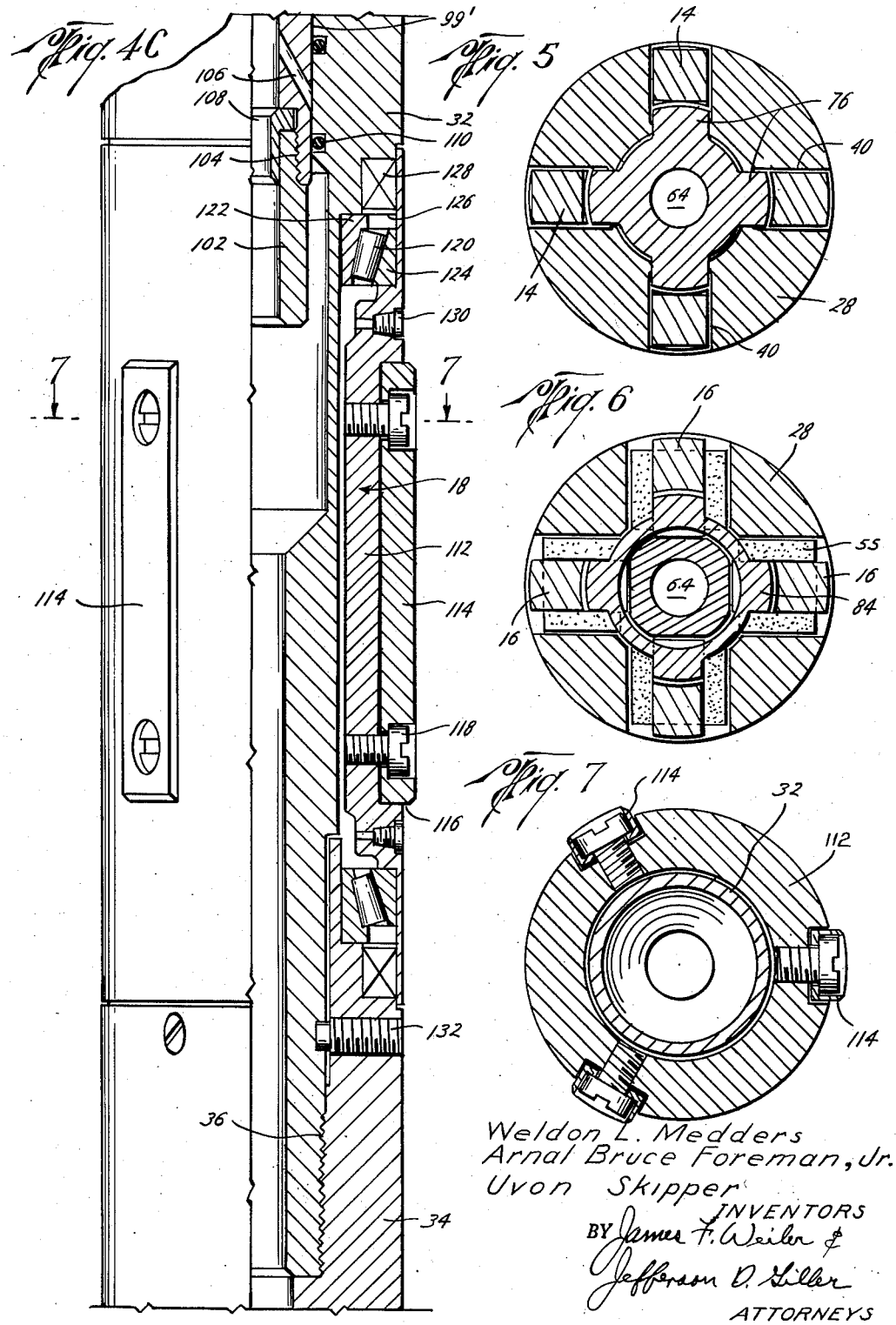

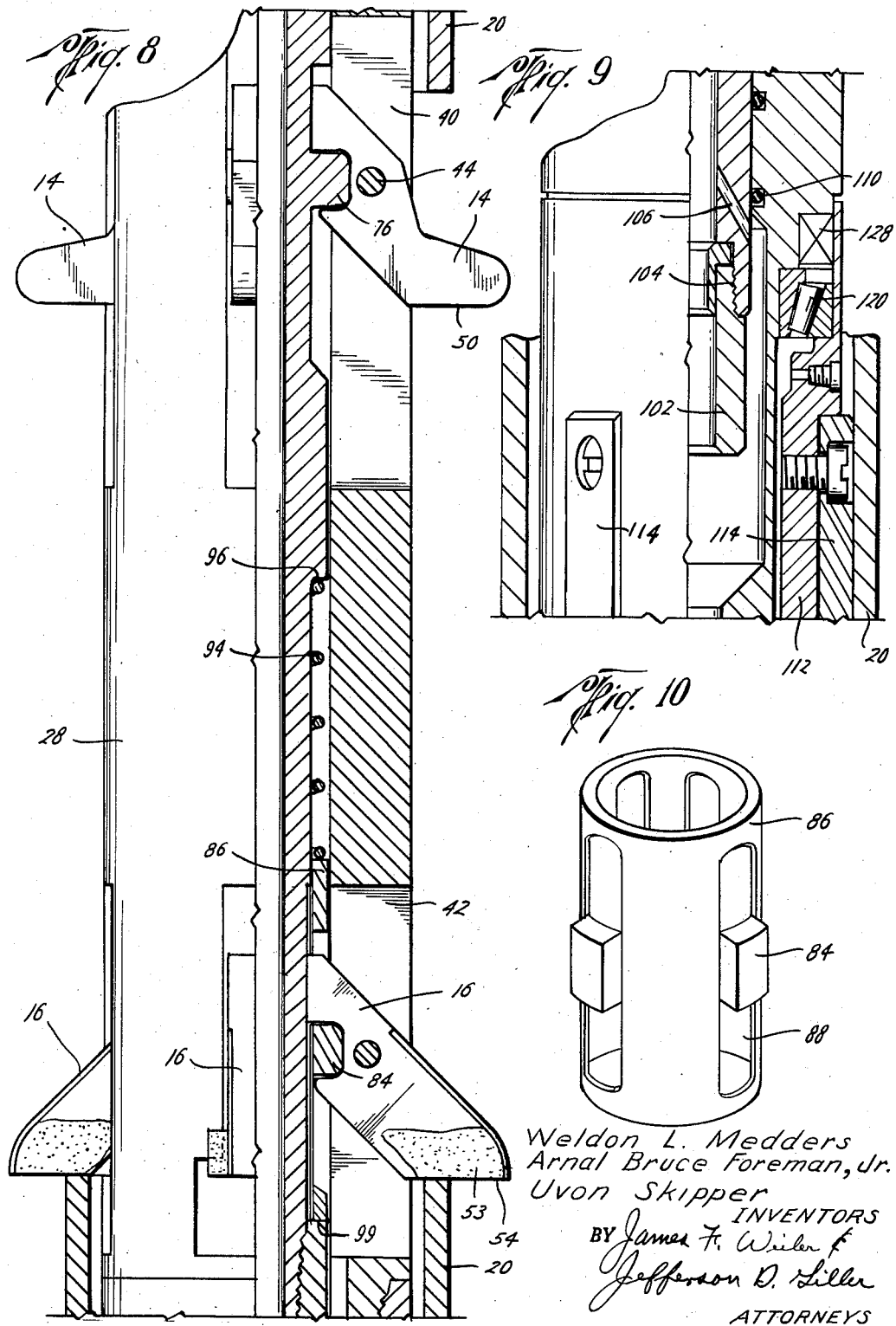

2,899,000

PISTON ACTUATED CASING MILL

Weldon L. Medders, Arnal Bruce Foreman, Jr., and Uvon Skipper, Houston, Tex., assignors to Houston Oil Field Material Company, Inc., Houston, Tex., a corporation of Delaware Application August 5, 1957, Serial No. 676,210

6 Claims. (Cl. 166—55.8)

This invention relates to a casing cutter and mill and more particularly to that type used in wells such as oil and gas wells for freeing casing stuck in a well bore.

In the drilling of oil and gas wells the casing of the well sometimes becomes lodged in the well bore so that it cannot be removed should it be necessary to do so. One of the methods to remove the stuck casing is to first cut through the wall of the casing adjacent the stuck portion and then mill downwardly from the top of this lower segment formed by cutting the casing until this segment of casing has been cut down as far as desired. It is toward an improvement in this type of casing cutter and mill that the present invention is directed.

An object of the present invention is to provide a casing cutter and mill having a plurality of circumferential rows of knives successively brought into milling engagement with an upper end of casing by fluid pressure on a slidable mandrel within the device.

Another object of the present invention is to provide such a casing and cutter mill in which the upper row of knives will first cut through the wall of the casing and thereafter mill downwardly on the lower segment of casing formed by the cut.

A further object of the present invention is to provide such a casing cutter and mill provided with a first set of knives particularly suited for cutting a window in the casing and a second set of knives particularly adapted for milling downwardly on the upper end of the lower segment of casing thus formed.

Another object of the present invention is to provide such a casing cutter and mill which does not require a reduction of fluid pressure in the tool when it is desired to cease the milling with one row of knives and begin the milling with another row of knives.

It is yet a further object to provide such a casing cutter and mill including valve means to indicate by a decrease in fluid pressure the cutting through of the casing.

A still further object of the present invention is the provision of means for urging the cutting and milling knives into position and includes means by which the knives are supported in cutting and milling positions which provides maximum support therefor thereby providing a rugged and efficiently-reliable tool in use.

A still further object of the present invention is the provision of a combination hydraulic and spring feed for the knives so that a predetermined and smoothly regulated force is applied to the knives.

A further object of the present invention is to provide a casing cutter and mill permitting circulation through the tool at all times.

Still another object is to provide a casing cutter and mill utilizing a stabilizer member rotatable with respect to the body of the tool to position the tool within the casing and reduce wear on the body of the tool.

Other and further objects will be apparent from the following description of a casing cutter and mill constructed in accordance with the invention and given for the purpose of disclosure, and by reference to the accompanying drawings, where like character references designate like parts throughout the several views, and where Figure 1 is a diagrammatic elevation in section of a tool constructed in accordance with the present invention being lowered through or removed from a casing, Figure 2 is a diagrammatic elevation in section of a tool constructed in accordance with a present invention illustrating the upper row of knives in milling engagement with the upper end of a lower section of casing, Figure 3 is a diagrammatic elevation in section of a tool constructed in accordance with the present invention illustrating the lower row of knives in milling engagement with the upper end of a lower section of casing, Figures 4A, 4B and 4C are fragmentary enlarged vertical views, partly in section, of the major portion of the tool shown in the same position as in Figure 1, Figure 5 is a cross-sectional view along the line 5—5 of Figure 4A, Figure 6 is a cross-sectional view along the line 6—6 of Figure 4B, Figure 7 is a cross-sectional view along the line 7—7 of Figure 4C, Figure 8 is an enlarged fragmentary view, partly in section, of the tool showing both rows of knives with the lower row of knives in milling engagement, Figure 9 is an enlarged fragmentary view partly in section illustrating the valve assembly of the present invention, and Figure 10 is an enlarged perspective view of the slidable sleeve used in bringing the lower row of knives into milling engagement.

Referring now to the drawings, and particularly to Figure 1, the tool 10 includes as a whole the elongate tubular body 12 having therein an upper row of knives 14 and a lower row of knives 16; a stabilizer member 18 which is rotatable with respect to the body 12 and which contacts the casing 20 to position the tool 10 in the casing 20; and the knife actuating mandrel 22 interior of the body 12 and adjacent the inner sides of the knives 14 and 16.

As shown in Figures 1 and 4A-4C, the body 12 is preferably made of several units for ease of manufacture and maintenance. The top unit is the tool joint 24 threadedly secured by the complementary threads 26 in axial alignment with the cutter body 28 which is in turn secured in axial alignment by the complementary threads 30 to stabilizer section 32. At the lower end of the stabilizer section 32 and in axial alignment therewith is the stabilizer nose piece 34 which is secured to the stabilizer section 32 by the complementary threads 36. As best illustrated in Figure 1 the lower end of the stabilizer section nose piece 34 is beveled as at 36 for ease of entrance into and passage downwardly through casing 20. The tool joint 24 forming the upper end of body 12 is adapted to be secured at its upper end to a conventional string of drilling pipe 25, which drilling or manipulating pipe has an axial bore communicating with the axial bore 38 extending the entire length of the body 12.

Referring now to Figures 4A, 4B, 5 and 6 it can be seen that the cutter body 28 has an upper row of circumferentially spaced knife slots 40 each holding a cutting and milling knife 14 and a lower row of circumferentially spaced knife slots 42 each holding a milling knife 16. While there are illustrated here four knives and slots in each circumferential row it is to be understood that these may be more or less in number as desired.

Each cutting and milling knife 14 is pivotally mounted in the knife body 28 by a pin 44 so that these knives 14 are brought into engagement with the casing 20 by outward radial movement of the lower end of the knives. At the exterior surface of the toe 48 of each knife 14 is a cutting surface 46 for cutting through the wall of the casing 20 when these knives 14 are so pivoted that this cutting surface 46 is brought into engagement with the wall of the casing 20. Interior of the toe 48 of each knife 14 is a conventional milling surface 50 which is brought into engagement for milling when the tool is in the position shown in Figure 2.

The lower row of knives 16 are milling knives only and instead of having a cutting surface are provided with a riding surface 52 which bears against the inside of the casing 20 when the upper set of knives 14 are in engagement with the casing 20, as will be made clearer later. Such riding surfaces 52 prevent unnecessary cutting of the casing 20 and permit the knives 16 to be easily rotated when the body 12 is rotated. Interior of the riding surface 52 is the milling surface 54 which mills away the upper end of casing 20 when the tool is in the position shown in Figure 8. As best shown by Figures 4B and 6, the knives 16 include a mass of hard facing 53 secured to each side of knife 16 to form part of the milling surafce 52. This hard facing 53 is made of particles of hard metal, such as tungsten carbide, set in a mild matrix, such as mild steel, and is applied by any conventional method such as with a welding rod containing such hard metal particles in a mild matrix and an oxyacetylene flame or an electric arc. As the knives 16 mill the casing 20 these hard metal particles provide a good milling surface. Of course, any desired cutting and milling surface may be provided.

The mandrel 22 is located slidably within the cutter body 28 adjacent the inner side of the knife slots 40 and 42. This mandrel 22 is part of a knife actuating assembly and causes radial movement of the lower end of the knives 14 and 16 by its upward and downward movement. A releasing spring 56 surrounds the exterior of mandrel 22 on a reduced diameter portion 59 adjacent an enlarged inner diameter portion 58 of the cutter body 28 and continuously urges the mandrel 22 upwardly by force against a shoulder 60 at the lower end of the enlarged inner diameter portion 58 of the cutter body 28 and against a shoulder 62 formed by an increased diameter portion on the exterior of the mandrel 22. Upward movement of the mandrel 22 is limited by contact of the upper end of the mandrel 22 with the lower end of the tool joint 24. As the tool joint 24 may be unthreaded from the cutter body 28 for introduction of the mandrel 22 into its proper position it provides a convenient upper stop means for the mandrel 22 although other stop means may be provided. To move the mandrel 22 downwardly, an upwardly facing pressure shoulder 68 is used and this is formed by providing the bore 64 of the mandrel 22 with a counterbored portion 66. Fluid pressure in bore 38 of the tool 10 forcing against this pressure shoulder 68 overcomes the releasing spring 56 and moves the mandrel 22 downwardly until the fluid pressure is released and then the releasing spring 56 causes the mandrel 22 to move upwardly.

A flat sole 70 on each knife 14 is received by a knife recess 72 on the exterior of the mandrel 22 when the knives 14 are not engaged, as best illustrated in Figure 4A, and permits each knife 14 to be retracted within the exterior of knife body 28 for passage of the tool into and from the cased well bore. On the heel of each knife 14 is a notch 74 which is complementary to and engages a lug 76 projecting from the knife recess 72. As thus constructed, when the mandrel 22 is forced downwardly by fluid pressure the lug 76 engages the notch 74 causing the toe 48 of knife 14 to pivot radially outward toward the position illustrated in Figure 8. If no casing is encountered by the toe 48 the knife will continue downward movement until each knife 14 assumes the position shown in Figure 8 where further pivoting of the knife 14 is prevented by the bearing surface 78 on the heel of knife 14 coming in contact with mandrel 22. As is clearly shown in Figure 4A, when the mandrel 22 moves upwardly the lug 76 will cause a downward pivoting of the toe 48 of knife 14 thus retracting the knife into the knife body 28 and, further, the tool joint 24 stops upward movement of mandrel 22 before the lug 76 completely clears notch 74 so that the knife 14 is not free to pivot outwardly and accidentally engage the casing 20.

The lower row of knives 16, like the knives 14, are pivotally mounted by a pin 80 for radial movement into milling engagement, which milling engagement position is best illustrated in Figure 8. Likewise a notch 82 is provided in the heel of each knife 16 and a complementary lug 84 engages the notch 82 and pivots the knife 16 outwardly. However, the lug 84 is not fixed to the mandrel 22 but is secured to a slidable sleeve 86, illustrated in perspective in Figure 10, which sleeve has knife recesses 88 each adapted to receive the flat sole 90 of a knife 16 permitting the knives 16 to be completely recessed within the knife body 28. The recesses 88 also receive the heels 92 preventing further pivoting of the knives 16 when they are in milling engagement.

Movement of this slidable sleeve 86 effects the same movement of each knife 16 as movement of the mandrel 22 causes on knives 14, however, movement of mandrel 22 does not directly cause movement of the slidable sleeve 86. Below the upper row of knives 14 the exterior of mandrel 22 is further reduced in diameter to receive a compression spring 94 which bears against a shoulder 96 formed at the upper end of this further reduced diameter portion 61 and against the upper end of slidable sleeve 86. When the tool is in the position illustrated in Figures 4A and 4B there is a very little if any compression of spring 94, but upon downward movement of mandrel 22 the spring 94 is compressed between the shoulder 96 and the upper end of slidable sleeve 86 causing the slidable sleeve to move downwardly pivoting the lower end of the knives 16 outwardly. If there is a casing adjacent the lower end of the knives 16 when this occurs the riding surface 52 will contact the inner wall of the casing 20 and prevent any cutting or milling engagement with the casing. However, if no casing is adjacent the knives 16 at that time the knives 16 will be rotated outwardly until the heel 92 engages the slidable sleeve 86 and the knives 16 are in milling position as shown in Figure 8 whereby the upper end of casing 20 may be milled downwardly. To prevent accidental outward pivoting of knives 16 when the tool is being placed in or removed from the well because of a downward movement of sleeve 86 from its own weight or a slight force from spring 94 there is provided a mandrel extension 98 as a part of mandrel 22 which mandrel extension 98 has an upwardly facing shoulder 99 abutting against the lower end of sleeve 86 and preventing downward movement of sleeve 86 prior to similar movement of mandrel 22.

Located at the lower end of mandrel 22 is a valve assembly 99′ creating a drop in fluid pressure in the drilling string when the knives 14 cut through the casing thus indicating to the operator at the surface of the earth that the casing has been cut and milling may commence. This may best be explained by referring to Figures 4B and 4C. The mandrel extension 98 is secured in axial alignment with mandrel 22 by the complementary threads 100 and secured to the lower end of the mandrel extension 98 is a mandrel nose piece 102 which is secured in axial alignment to the mandrel extension 98 by the complementary threads 104. The mandrel extension contains through its wall one or more passageways 106. Below the passageways 106 is a constriction 108 within the bore 64 of mandrel 22 which constriction 108 is here illustrated as a bushing held in place by the mandrel nose piece 102. The purpose of the constriction 108 is to permit a fluid pressure build-up above it in excess of the pressure in the tool below this constriction 108. As best shown in Figure 4C the discharge ends of the passageways 106 are blocked off by the inner wall of the stabilizer section 32 and sealing means such as the O-rings 110 when the knives 14 and 16 are in the retracted position illustrated in Figures 4A, 4B and 4C. Below the O-rings 110 the bore 38 is increased in diameter so that when the mandrel 22 is moved downwardly into the position illustrated in Figure 8 and Figure 9 the passageways 106 come into fluid communication with the interior of stabilizer section 32 and fluid may pass from the bore 64 of mandrel 22 through the passageways 106 into the bore of the body 12 in addition to passing completely through the mandrel 22. Thus, when a cut is made through the wall of the casing 20 and the mandrel 22 moves downwardly to the position shown in Figures 8 and 9 the passageways 106 will give added area for flow and a drop of fluid pressure in the drill stem will result indicating the cutting of the casing wall.

Referring to Figure 4C, the stabilizer member 18 includes the stabilizer cage 112 which is rotatably secured on the exterior of stabilizer section 32 and which cage 112 carries the stabilizer blades 114 secured in circumferentially spaced slots 116 by bolts 118. These blades 114 are beveled at the upper and lower ends to aid passage of the tool through the casing 20 and are inserted in the slots 116 to help hold them in position. As these blades 114 are designed to take the wear from much of the tool 10 as it is moved in the casing they are normally made of wear resistant material. Any suitable means, such as wipers, bow springs and the like may be used for this purpose.

Any conventional means may be used to allow the stabilizer cage 112 to rotate freely with respect to the stabilizer section 32 such as the use of roller bearings 120 turning between the inner race 122 and the outer race 124 and against the retainer ring 126. Packing 128 is used to form a seal on the outside of this bearing assembly and a conventional grease fitting 130 located inwardly of the bearing assembly provides a means of lubrication. This means of permitting rotation between the stabilizer section 32 and stabilizer cage 112 is identical at both ends of the stabilizer cage 112.

While the stabilizer blades 114, as illustrated in Figure 7, are here shown to extend equal distances from the exterior of the stabilizer cage 112, if desired, they may extend unequal distances as disclosed by the patent to Robishaw, No. 2,690,218, dated September 28, 1954, so that an eccentric action is transmitted to the upper portions of the tool when it is rotated thus giving a sawing action to the milling and cutting of the knives 14 and 16.

The outer diameter of the stabilizer section 32 is reduced to receive the stabilizer cage 112 so that the exterior of the stabilizer cage 112 is flush with the exterior of the body 12 above stabilizer cage 112. For ease of construction, the exterior of stabilizer section 32 is not increased in diameter again below stabilizer cage 112, but instead stabilizer section nose piece 34 is secured thereto by complementary threads 36 exterior of stabilizer section 32 and interior of stabilizer section nose piece 34 and by set screws 132.

In operation, the tool 10 is secured to a string of pipe 25 by the tool joint 24 or some other conventional means and the string of pipe with the tool attached to the lower end thereof is lowered into the cased well bore in the position shown in Figure 1. During this downward movement fluid in the well bore below the tool is permitted to pass upwardly through the tool because of the bore 38 of the tool and the bore 64 within the mandrel. When the tool has reached the position where the casing is to be cut and milled away, fluid pressure in the drilling stem and consequently in the bore 38 of the body is increased in the usual way. This pressure increase exerts a downward force on the pressure shoulder 68 in the mandrel 22 causing the mandrel 22 to overcome releasing spring 56 and move downwardly. Upon such downward movement the lugs 76 on mandrel 22 engage notches 74 in knives 14 in the upper row causing the toe 48 of each knife 14 to pivot outwardly with the cutting surface 46 engaging the casing 20. This same downward movement of mandrel 22 forces downwardly against spring 94 resulting in slidable sleeve 86 moving downwardly so that lugs 84 engage notches 82 and knives 16 are likewise pivoted outwardly. Upon such outward movement of knives 16 the riding surface 52 of these knives 16 will contact the casing and further radial movement of the lower set of knives will stop. The body 12 is then rotated by turning the operating string 25 and as all the knives rotate with the body 12 the cutting surfaces 46 on the knives 14 in the upper row will cut into the wall of the casing 20 while no such cutting action occurs by the lower set of knives 16 because of the riding surfaces 52.

As rotation of the tool 10 is continued, with pressure in the bore 38 forcing downwardly on mandrel 22, the toes 48 of the knives 14 will effect a cut through the casing. Immediately upon such cut being made the fluid pressure will force mandrel 22 downwardly until the heels 78 of the knives 14 rest against the mandrel as illustrated in Figure 8 and the tool will then be in the position shown in Figure 2. Thereafter a milling action will take place with the milling surfaces 50 on the knives 14 milling away the upper end of the lower section of casing 20. Immediately upon penetration of the casing wall by the knives 14 and the downward movement of the mandrel 22 permitted thereby, the valve assembly will move downwardly into the position shown in Figure 9 so that the passageways 106 within mandrel 22 are in fluid communication with the bore 38 of the tool below the mandrel resulting in a drop of fluid pressure in the drill string which indicates to the operator that the casing 20 has been cut.

Rotation is then continued until the upper set of knives 14 mill downwardly to a distance at least equal to the linear distance between the knives 14 of the upper row and the knives 16 of the lower row. When this amount of milling has taken place the tool 10 may be raised without cessation of the pumping which creates the fluid pressure in the tool. When the knives 16 clear the upper end of the lower segment of casing 20 the slidable sleeve 86 through the action of the spring 94 will move the lower end of knives 16 outwardly into the position illustrated in Figures 3 and 8 and thereafter milling takes place with this lower set of knives 16 doing the milling.

When a sufficient amount of casing 20 has been milled away, the operator stops the pump and thus reduces the fluid pressure acting against the mandrel 22. The mandrel is then forced upwardly by the releasing spring 56 into the position shown in Figure 4A and Figure 1 causing the knives 14 to assume the position shown in these figures. Upward movement of mandrel 22 carries slidable sleeve 86 upward because of shoulder 99 and this action similarly retracts knives 16.

During the entire cutting cycle fluid passes downwardly through a bore 38 in the body 12 and through the bore 64 of the mandrel 22 to carry away cuttings, to lubricate and the like. Additionally, during the lowering and raising and also during the rotation of the tool the stabilizer blades 114 prevent wear on the exterior of most of the tool and during rotation also position the tool 10 within the casing 20. It is desirable to have the stabilizer blades 114 mounted so that they may remain relatively stationary in the hole upon rotation of the tool 10 as this reduces the amount of wear on the surface of these blades 114 which may be considerable when it is realized that often times eighteen hours are necessary to mill away the desired segment of casing 20. To help reduce wear on the tool 10, a conventional stabilizer ring, not shown, will normally be placed in the string of drilling pipe 25 above the tool 10 so that this tool 10 is then stabilized by the stabilizer blades 114 and the stabilizer ring.

While only two rows of knives 14 and 16 have been illustrated, any additional number of rows of milling knives 16 may be utilized by extending the knife body 28 and putting in additional slots, extending the mandrel 22, and placing another spring 94 and another slidable sleeve 86 for each additional row of knives 16.

From the example given of the invention for the purpose of disclosure, it is apparent that numerous changes in the details and arrangements of parts may be made. It is also apparent that the present invention fulfills the stated objects as well as others inherent therein. Accordingly, it is desired to be limited only by the spirit of the invention as defined by the scope of the appended claims.

What is claimed is:

1. A casing mill for use in a cased well bore having fluid pressure therein comprising, an elongate body having a longitudinal bore, said body provided with at least two longitudinally-spaced circumferential rows of slots extending therethrough; knives mounted in said slots for radial movement outwardly of said body into engagement with the casing; cutting surfaces on one row of knives for cutting through the casing; milling surfaces on the knives for milling against an end of the casing; a knife actuating assembly including a tubular mandrel slidable in the body adjacent the rows of knives, a pressure surface associated with the mandrel adapted to cause longitudinal movement of the mandrel upon the application of fluid pressure upon pressure surface, resilient means yieldingly resisting longitudinal movement of the mandrel, inter-engaging elements on the exterior of the mandrel and on the knives for moving the one row of knives radially outwardly into cutting and milling engagement with the casing upon such longitudinal movement of the mandrel and to retract such one row of knives upon reverse longitudinal movement of the mandrel, additional means on the mandrel including resilient means urging the other rows of knives outwardly upon such longitudinal movement of the mandrel, and additional inter-engaging elements associated with the mandrel and on the other rows of knives for retracting the other raws of knives upon reverse longitudinal movement of the mandrel .

2. A casing mill for use in a cased well bore having fluid pressure therein comprising, an elongate body having a longitudinal bore, said body provided with at least two longitudinally-spaced circumferential rows of slots extending therethough; knives mounted in said slots for radial movement outwardly of said body into engagement with the casing; cutting surfaces on the uppermost row of knives for cutting through the casing; milling surfaces on the knives for milling downwardly on the casing; a knife actuating assembly including a tubular mandrel slidable in the body adjacent the rows of knives, a pressure surface associated with the mandrel adapted to cause downward movement of the mandrel upon application of fluid pressure upon the pressure surface, resilient means between the mandrel and body yieldingly urging the mandrel upwardly, inter-engaging elements on the exterior of the mandrel and on the uppermost row of knives for moving the uppermost row of knives radially outwardly into cutting and milling engagement with the casing upon downward movement of the mandrel and to retract such knives on upward movement of the mandrel, additional means on the mandrel including resilient means urging the lower rows of knives outwardly upon such downward movement of the mandrel, and additional inter-engaging elements associated with the mandrel and on the lower rows of knives for retracting the lower rows of knives upon upward movement of the mandrel.

3. The casing mill of claim 2 in which the knives other than in the uppermost row have surfaces on them adapted to prevent their cutting through the casing.

4. A casing mill for use in a cased well bore having fluid pressure therein comprising, an elongate body having a longitudinal bore; a plurality of longitudinally-spaced circumferential rows of knives in said body and movable therewith, the knives in each row being mounted in slots through the body for radial movement outwardly of said body into engagement with the casing; cutting surfaces on one row of knives for cutting through the casing; milling surfaces on the knives for milling against an end of the casing; a knife actuating assembly including a tubular mandrel slidable in the body adjacent the rows of knives, a pressure surface associated with the mandrel adapted to cause longitudinal movement of the mandrel relative to the body upon the application of fluid pressure upon the pressure surface, resilient means between the mandrel and body yieldingly resisting longitudinal movement of the mandrel, inter-engaging elements on the exterior of the mandrel to move the one row of knives radially outward into cutting and milling engagement with the casing upon such longitudinal movement of the mandrel and to retract such knives upon reverse longitudinal movement of the mandrel, a slidable sleeve on the mandrel adjacent each said other row of knives, each said sleeve having means thereon to engage knives of each such other rows and move them outwardly upon said longitudinal movement of the mandrel and to retract them upon reverse longitudinal movement of the mandrel, and resilient means exterior of the mandrel forcing against each such slidable sleeve upon said longitudinal movement of the mandrel.

5. A casing mill for use in a cased well bore having fluid pressure therein comprising, an elongate body having a longitudinal bore, said body provided with at least two longitudinally-spaced circumferential rows of slots extending therethrough; knives mounted in said slots for radial movement outwardly of said body into engagement with the casing; cutting surfaces on the uppermost row of knives for cutting through the casing; milling surfaces on the knives for milling downwardly on the casing; a knife actuating assembly including a tubular mandrel slidable in the body associated with the rows of knives, a pressure surface associated with the mandrel adapted to cause downward movement of the mandrel relative to the body upon the application of fluid pressure on the pressure surface, resilient means between the mandrel and the body yieldingly urging the mandrel upwardly, inter-engaging elements on the exterior of the mandrel to move the uppermost row of knives radially outward into cutting and milling engagement with the casing upon downward movement of the mandrel and to retract such knives on upward movement of the mandrel, a slidable sleeve on the mandrel adjacent each said other row of knives, each said sleeve having means thereon to engage knives of each such other row and move them outwardly upon downward movement of the mandrel and to retract them upon upward movement of the mandrel, and resilient means exterior of the mandrel forcing downwardly against each such slidable sleeve upon downward movement of the mandrel.

6. In a casing cutter and mill for use in a cased well bore having fluid pressure therein, said casing cutter and mill having a hollow body adapted to move in said cased well bore, a plurality of longitudinally-spaced circumferential rows of knives in said body and movable therewith, the knives in each row being mounted in slots through the body for radial movement outwardly of said body into engagement with the casing, the improvement comprising, a knife-actuating assembly including a tubular mandrel slidable in the body adjacent the rows of knives, a pressure surface associated with the mandrel adapted to cause longitudinal movement of the mandrel relative to the body upon the application of fluid pressure upon the pressure surface, resilient means yieldingly resisting longitudinal movement of the mandrel, inter-engaging elements on the exterior of the mandrel to move the one row of knives radially outward into cutting and milling engagement with the casing upon such longitudinal movement of the mandrel and to retract such knives upon reverse longitudinal movement of the mandrel, a slidable sleeve on the mandrel adjacent each said other row of knives each said sleeve having means thereon to engage the knives of each such other row and move them outwardly upon said longitudinal movement of the mandrel and to retract them upon reverse longitudinal movement of the mandrel, and resilient means exterior of the mandrel forcing against each said slidable sleeve upon said longitudinal movement of the mandrel.

References Cited in the file of this patent
UNITED STATES PATENTS

| | | |
|---|---|---|
| 2,134,796 | Osmun | Nov. 1, 1938 |
| 2,215,638 | Ellis | Sept. 24, 1940 |
| 2,309,225 | Ventresca et al. | Jan. 26, 1943 |
| 2,690,218 | Robishaw | Sept. 28, 1954 |
| 2,735,485 | Metcalf | Feb. 21, 1956 |